US009977623B2

(12) United States Patent
Jean et al.

(10) Patent No.: US 9,977,623 B2
(45) Date of Patent: May 22, 2018

(54) DETECTION OF A SEQUENTIAL COMMAND STREAM

(71) Applicant: SANDISK TECHNOLOGIES INC., Plano, TX (US)

(72) Inventors: Sebastien A. Jean, Boise, ID (US); Noga Deshe, Ra'anana (IL); Lilia Brechman, Hod Hasharon (IL); Yan Nosovitsky, Herzliya (IL); Yaron Zamir, Rishon Lezion (IL); Judah Gamliel Hahn, Ofra (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days. days.

(21) Appl. No.: 14/884,637

(22) Filed: Oct. 15, 2015

(65) Prior Publication Data

US 2017/0109096 A1  Apr. 20, 2017

(51) Int. Cl.
*G06F 12/00* (2006.01)
*G06F 3/06* (2006.01)
*G06F 12/1018* (2016.01)
*G06F 12/02* (2006.01)
*G06F 9/00* (2006.01)

(52) U.S. Cl.
CPC .......... *G06F 3/0659* (2013.01); *G06F 3/0611* (2013.01); *G06F 3/0679* (2013.01); *G06F 9/00* (2013.01); *G06F 12/0246* (2013.01); *G06F 12/1018* (2013.01)

(58) Field of Classification Search
CPC .......................... G06F 3/0659; G06F 12/1018
See application file for complete search history.

(56) References Cited

U.S. PATENT DOCUMENTS

| 7,392,340 | B1 | 6/2008 | Dang et al. |
| 8,380,909 | B2 | 2/2013 | Borchers et al. |
| 8,566,317 | B1 * | 10/2013 | Ren ..................... G06F 17/3071 707/737 |
| 2002/0002655 | A1 * | 1/2002 | Hoskins ................ G06F 3/0626 711/112 |
| 2005/0132342 | A1 * | 6/2005 | Van Lunteren ... G06F 17/30985 717/143 |
| 2008/0016295 | A1 * | 1/2008 | Yim .................... G06F 11/2082 711/156 |
| 2009/0172264 | A1 * | 7/2009 | Chung .................... G06F 3/061 711/103 |
| 2010/0262979 | A1 | 10/2010 | Borchers et al. |
| 2012/0017069 | A1 | 1/2012 | Bourd et al. |

(Continued)

*Primary Examiner* — Ryan Bertram
*Assistant Examiner* — Trang Ta
(74) *Attorney, Agent, or Firm* — Toler Law Group, PC

(57) ABSTRACT

A data storage device includes a non-volatile memory and a controller coupled to the non-volatile memory. The controller is configured to receive a first command from an access device, the first command associated with a first logical block address (LBA). The controller is also configured to, after receiving the first command, receive a second command and a third command from the access device. The second command is associated with a second LBA that precedes the first LBA, the third command is associated with a third LBA that succeeds the first LBA. The controller is further configured to determine that the first command, the second command, and the third command correspond to a sequential command stream.

20 Claims, 14 Drawing Sheets

(56) References Cited

U.S. PATENT DOCUMENTS

| | | | |
|---|---|---|---|
| 2013/0275656 A1* | 10/2013 | Talagala | G06F 12/0246 711/103 |
| 2013/0279283 A1* | 10/2013 | Seo | G11C 7/00 365/222 |
| 2014/0136798 A1* | 5/2014 | Stark | G06F 9/34 711/147 |
| 2014/0164730 A1* | 6/2014 | Gold | G06F 3/0608 711/171 |
| 2014/0331001 A1* | 11/2014 | Liu | G06F 3/0659 711/103 |
| 2014/0337562 A1* | 11/2014 | Long | G06F 3/0659 711/103 |
| 2014/0365746 A1* | 12/2014 | Smith | G06F 12/08 711/202 |
| 2015/0074337 A1* | 3/2015 | Jo | G06F 12/0246 711/103 |
| 2015/0081933 A1 | 3/2015 | Vucinic et al. | |
| 2015/0095554 A1* | 4/2015 | Asnaashari | G06F 12/0246 711/103 |
| 2015/0186074 A1 | 7/2015 | Benisty et al. | |
| 2016/0004602 A1* | 1/2016 | Wilkinson | G06F 11/2082 714/19 |
| 2017/0103024 A1* | 4/2017 | Matsuo | G06F 12/123 |

* cited by examiner

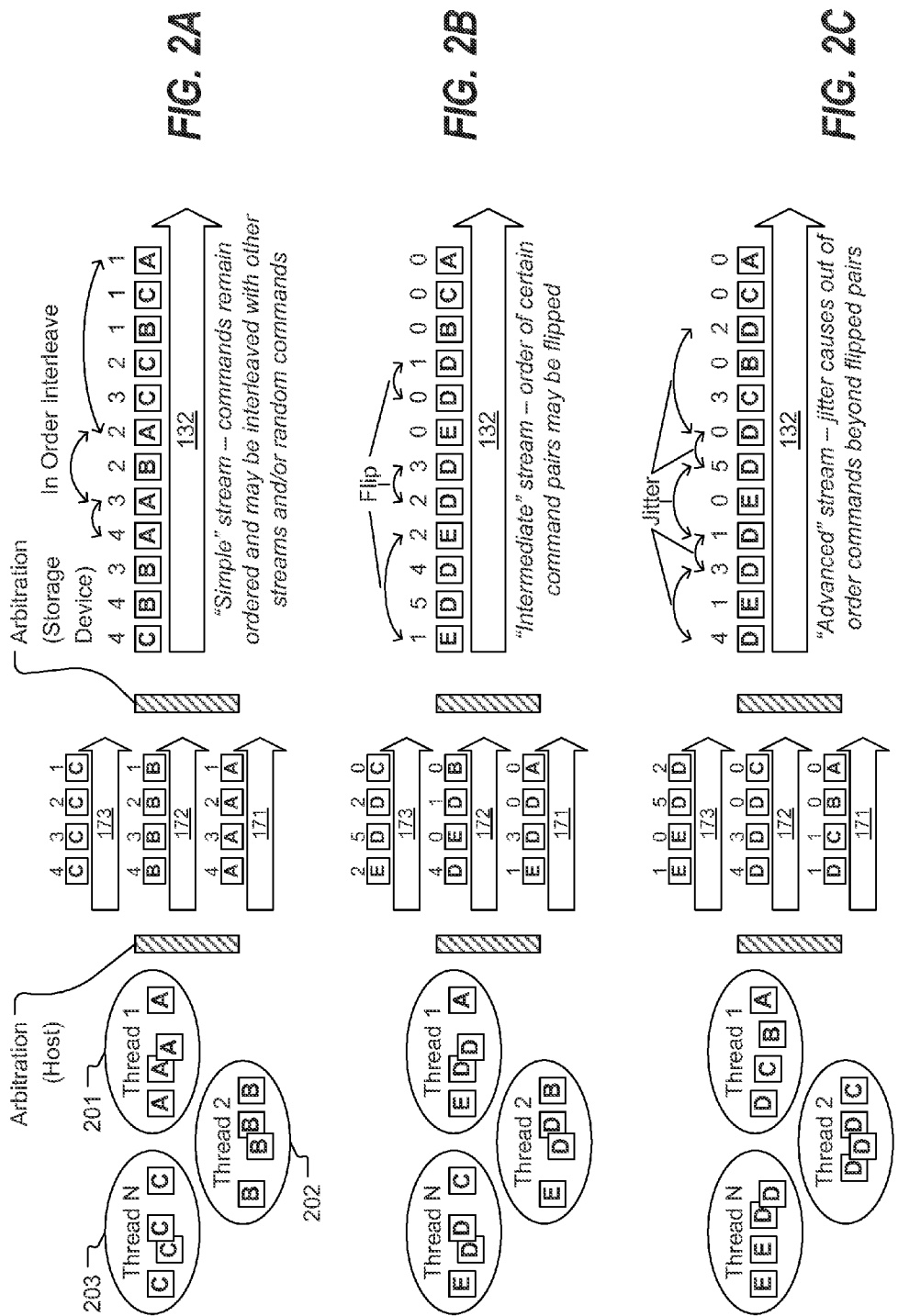

DETECTION OF A SEQUENTIAL COMMAND STREAM

FIELD OF THE DISCLOSURE

The present disclosure is generally related to detecting a sequential command stream.

BACKGROUND

When a host device sends commands, such as read or write commands, to a memory device, operation at the memory device can be performed more efficiently if the host device indicates (or if the memory device determines) whether the commands are part of a sequential command stream. A "sequential command stream" is a collection of commands that is collectively directed to a consecutive range of logical block addresses (LBAs). For example, a sequential command stream may include read commands issued by the host to read a large file from the memory device, such as when a user watches a video file. As another example, a sequential command stream may include write commands issued by the host to write a large file to the memory device. In some systems, the host device provides commands to the memory device using a queue, and the commands can be examined while in the queue to determine whether the commands are part of a sequential command stream. For example, a sequential command stream may be identified if commands in the queue, progressing from the front of the queue (earliest received command) to the back of the queue (latest received command), follow a general pattern:

starting LBA of command+command length=starting LBA of next command, where "command length" refers to the range of LBAs covered by the command. With advances in technology, memory devices are becoming smaller, faster, and capable of storing larger amounts of data, which in some cases may be received via multiple queues instead of a single queue. When a host device has multiple queues available via which to transmit a sequential command stream, the individual commands of the stream may arrive at the memory device out of order and via different queues. Thus, existing stream identification techniques may be unable to detect the presence of the sequential command stream.

BRIEF DESCRIPTION OF THE DRAWINGS

FIGS. 2A, 2B, and 2C illustrate particular examples of sequential command streams that may be detected by the data storage device of FIG. 1;

DETAILED DESCRIPTION

Figure 1:
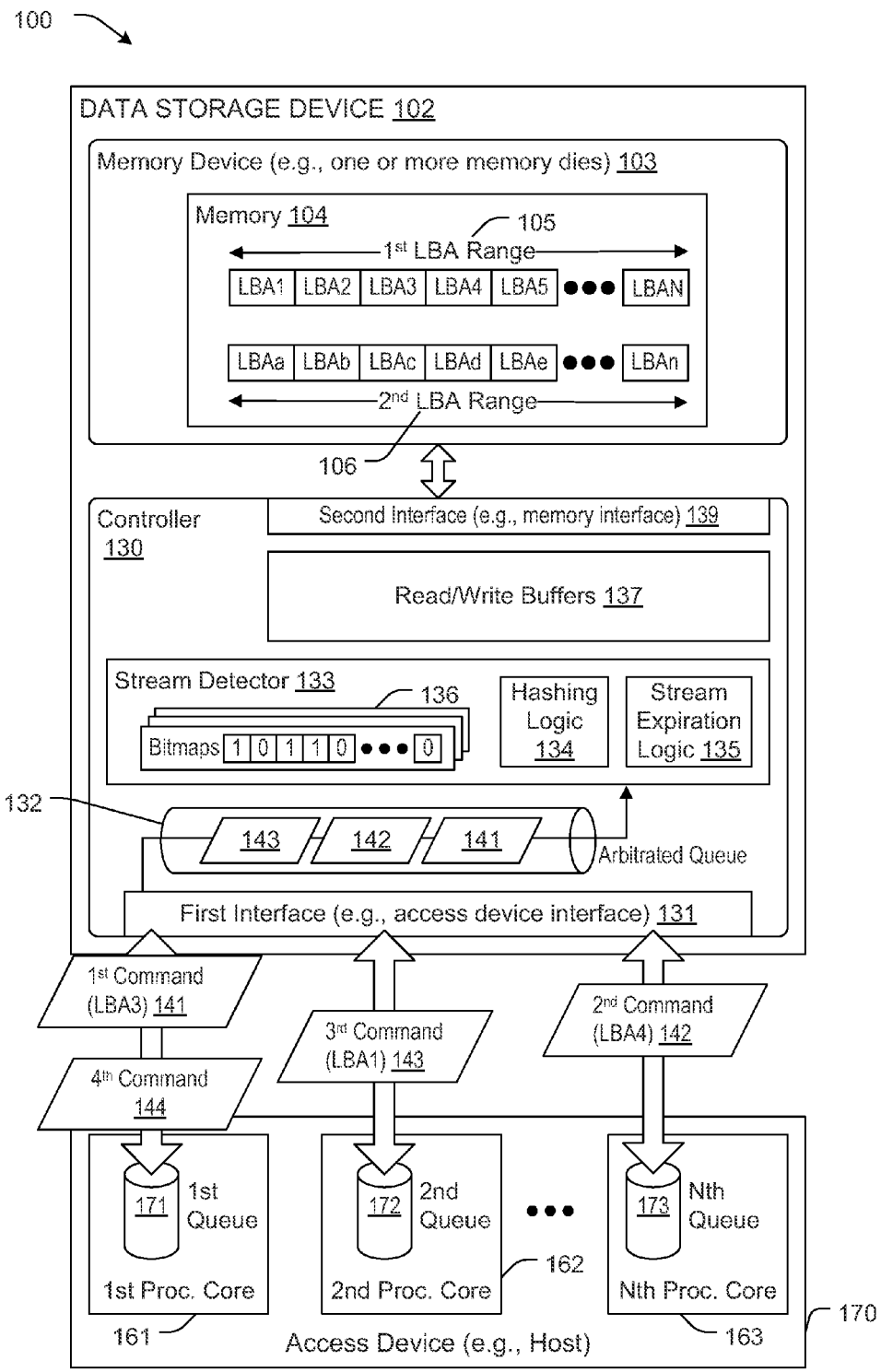
FIG. 1 is a diagram of a particular illustrative example of a system that includes a data storage device configured to detect a sequential command stream.

Particular aspects of the disclosure are described below with reference to the drawings. In the description, common features are designated by common reference numbers. As used herein, "examplary" may indicate an example, an implementation, and/or an aspect, and should not be construed as limiting or as indicating a preference or a preferred implementation.

The present disclosure provides systems and methods of detecting sequential command streams, including in situations where the commands of the sequential command stream are received out of order, are interleaved with commands from other streams or random commands, are received via multiple queues, etc. According to a particular example, commands from multiple queues may be combined, via arbitration techniques, into a single arbitrated queue. The commands in the arbitrated queue may be retrieved and processed to determine whether at least a threshold number of the commands that have been retrieved from the arbitrated queue are directed to the same LBA range (alternatively referred to herein as a "bucket"). If so, a sequential command stream directed to the LBA range may be detected.

In a particular example, a controller of a data storage device device maintains a hash table of stream detector data structures. Each LBA bucket in a memory of the data storage device corresponds to a particular stream detector data structure in the hash table. Each of the stream detector data structures includes a bitmap to track how many commands directed to the corresponding LBA bucket have been received during a threshold period of time (e.g., during a previous X commands, where X is an integer greater than or equal to 1). When a command directed to a particular LBA is received, the controller may mask off lower order bits of the particular LBA to determine the LBA bucket that the particular LBA is a part of. The controller may then identify the stream detector data structure in the hash table that corresponds to the LBA bucket and may assert (e.g., flip from zero to one) a bit of the bitmap in the identified stream detector data structure. This process may be repeated as additional commands are received. When a bitmap in the hash table becomes "full" (e.g., when all or at least a threshold number of bits in the bitmap have been asserted), the controller may detect a sequential command stream directed to the corresponding LBA bucket, and subsequent commands directed to LBAs in that LBA bucket or to neighboring LBA buckets may be processed as part of a sequential command stream rather than as discrete or "random" commands.

For example, the controller may perform one or more operations in response to detecting a sequential command stream. To illustrate, data that is written sequentially is often read sequentially as well. Thus, if the controller detects a sequential stream of write commands, the controller may distribute write operations across multiple memory dies of the data storage device. By doing so, read parallelism may be increased, so that the data can be read faster. As another example, in the case of a write stream, write operations may be buffered and then executed as a group when the buffer is flushed or when a timeout period elapses, which may increase write throughput by decreasing the number of times memory die(s) are "opened" and "closed." As yet another example, in the case of a sequential read stream, read look ahead (RLA) operations may be performed to prefetch data corresponding to a "next," LBA or range of LBAs that is sequential with respect to a "current" LBA, which may increase read throughput at the data storage device.

Referring to FIG. 1, a particular illustrative example of a system is depicted and generally designated 100. The system 100 includes a data storage device 102 and an access device 170 (e.g., a host device). The data storage device 102 includes a controller 130 and a memory device 103, which may correspond to one or more memory dies. The memory dies may collectively represent a memory 104. In an illustrative example, the memory 104 corresponds to a non-volatile memory device, such as a flash memory or a resistive random access memory (ReRAM).

The controller 130 may be coupled to the access device 170 via a first interface 131 and to the memory device 103 via a second interface 139. The first interface 131 may be an access device (e.g., host) interface, such as a small computer system interface (SCSI), a Fibre Channel, a peripheral component interconnect express (PCIe), and/or a non-volatile memory express (NVMe) interface. In some examples, the data storage device 102 may include or correspond to a solid-state drive (SSD) that is accessible via NVMe protocol(s). The first interface 131 may facilitate transfer for data, control signals, timing signals, and/or power transfer between the access device 170 and the data storage device 102.

During operation, the access device 170 may issue commands, such as read commands and/or write commands, to the data storage device 102. Depending on the type of the data storage device 102 and the type of the interface 131, such commands may be communicated from the access device 170 to the data storage device 102 via one or more command queues. For example, NVMe may support up to 64K queues, each of which may include up to 64K commands. In the example shown in FIG. 1, the access device 170 includes N queues 171-173, where each of the queues 171, 172, and 173 is allocated to a respective processor core 161, 162, or 163 of the access device 170. In this example, while an execution thread at the access device 170 executes on a particular processor core (e.g., the first processor core 161), requests issued by the execution thread for the data storage device 102 may be inserted into the queue (e.g., the first queue 171) allocated to the processor core.

Certain commands issued by execution threads of the access device 170 may be "random" or discrete commands, while other commands may be part of a sequential command stream. For example, if an execution thread at the access device 170 is in the process of reading or writing a large file, the access device 170 may issue a sequential stream of read or write commands that are directed to a particular range of LBAs in the memory 104 (e.g., an illustrative first LBA range 105 or second LBA range 106). It should be noted that although the LBA ranges 105, 106 are illustrated as stored linearly in FIG. 1, this is not to be considered limiting. For improved read performance, the LBAs of the LBA ranges 105, 106 may be distributed (e.g., equally) between multiple memory dies. In some access devices, execution threads may migrate between the processor cores 161-163, and workload, latency, etc. may vary between the processor cores 161-163. As a result, commands in the sequential stream may be communicated via more than one of the queues 171-173 and may arrive at the data storage device 102 out of order.

In the example of FIG. 1, the access device 170 is illustrated as issuing a sequential stream of commands directed to the first LBA range 105. In a latency-controlled scenario, this would mean that commands directed to LBA1, LBA2, LBA3, . . . LBAN arrive at the data storage device 102 in order. However, in the example shown, a first command 141 directed to LBA3, a second command 142 directed to LBA4, and a third command 143 directed to LBA1 arrive out of order and via multiple queues.

To detect sequential command streams in such scenarios, the controller 130 may place received commands into a single arbitrated queue 132. For example, received commands may be aggregated and sequenced for insertion into the arbitrated queue 132 based on time of arrival. A stream detector 133 may retrieve and processes commands from the arbitrated queue 132. When a command is retrieved from the arbitrated queue 132, hashing logic 134 of the controller 130 may determine the LBA range that includes the LBA(s) specified by the command. For example, the hashing logic 134 may determine that the first command 141, which specifies LBA3, is directed to the first LBA range 105. In response, a bit of a bitmap 136 corresponding to the first LBA range 105 may be asserted (e.g., flipped from zero to one). When the second command 142 and the third command 143 are processed, additional bits of the bitmap 136 may be asserted, because the second command 142 and the third command 143 are directed to the same LBA range 105 as the first command 141. As further described with reference to FIGS. 2-11, when a sufficient number of bits in the bitmap 136 have been asserted (e.g., the particular bitmap is "full"), a sequential stream directed to the first LBA range 105, and potentially to neighboring LBA range(s), may be detected. When a fourth command 144 is received, the controller 130 may determine whether the fourth command 144 is a part of the detected sequential command stream, and/or how to process the fourth command 144, based on whether a LBA indicated by the fourth command 144 is included in the first LBA range 105.

The stream detector 133 includes stream expiration logic 135. In a particular aspect, the stream expiration logic 135 prevents detection of sequential command streams if more than a threshold amount of time has elapsed or if a threshold number of commands have been processed while "filling" a bitmap 136. The stream expiration logic 135 may also be configured to "reset" a bitmap 136, such as by flipping all bits of the bitmap 136 back to zero, when at least a threshold amount of time has passed or at least a threshold number of commands have been processed since the last time a command for the stream was processed.

The controller 130 may perform one or more operations in response to detection of a sequential command stream. For example, if a sequential command stream of read commands is detected, the controller 130 may perform RLA operations to prefetch data (e.g., into one or more buffers, illustrated in FIG. 1 as read/write buffers 137). In a particular aspect, the controller 130 may prefetch all or a portion of a page, a meta-page, a block, one or more LBAs, etc., when processing a read command that is part of sequential command stream, so that a subsequent read request for the prefetched data can be processed without having to perform repeated accesses of the memory 104. In a particular aspect, the amount of data that is prefetched can be based on a depth or total number of commands present in one or more of the queue(s) 171-173 or the arbitrated queue 132. As another example, if a sequential command stream of write commands is detected, the controller may store the data to be written in one or more of the buffers 137 until particular memory die(s), pages, meta-pages, etc. are available to accept such data or until a cache flush timeout occurs. Alternatively, or in addition, the data may be written across several memory dies, so that the same data can be read faster in the future due to read parallelism.

FIG. 1 thus illustrates an example of a data storage device 102 that is configured to detect a sequential command stream, even if the individual commands streams of the stream are received out of order and via multiple queues. It will be appreciated that the stream detection techniques illustrated in FIG. 1 may be performed with little processing overhead. For example, the hashing, lookup, and bit-flip operations performed by the stream detector 133 may be approximately constant order, i.e., $O(1)$, operations whose complexity does not increase with an increase in the number of command queues or an increase in the depths the command queues.

FIGS. 2A, 2B, and 2C illustrate examples of streams that may be detected by the stream detector 133 of FIG. 1. In the examples shown, commands are issued by three execution threads 201, 202, and 203, which are denoted Thread 1, Thread 2, and Thread N. It is to be understood that in alternative examples, a different number of execution threads, for example at an access device such as the access device 170 of FIG. 1, may issue commands As further described herein, threads may be "locked" to a processor core or may move between processor cores, and each processor core may have an assigned input/output (I/O) queue for commands. Different threads may execute different workloads at different times, and execution of certain workloads may result in issuance of a sequential command stream.

To illustrate, FIG. 2A depicts an example of sequential command stream(s) that may result when threads are locked to processor cores, strict round robin execution is performed amongst the processor cores, and each thread is assigned a sequential range of addresses (e.g., LBAs) on which to operate. Thus, in FIG. 2A, each of the threads 201-203 issues commands for a single sequential command stream—Thread 1 issues commands A1, A2, A3, A4, . . . for sequential command stream A into the first queue 171, Thread 2 issues commands B1, B2, B3, B4, . . . for sequential command stream B into the second queue 172, and Thread N issues commands C1, C2, C3, C4, . . . for sequential command stream C into the Nth queue 173. Due to the locking of threads to processor cores and strict round robin execution, even though the commands from the queues 171-173 are interleaved in the arbitrated queue 132, the commands for each sequential command stream A, B, and C remain in order within the arbitrated queue 132.

FIG. 2B differs from FIG. 2A in that FIG. 2B illustrates load balancing between threads. Thus, in FIG. 2B, each of the queues 171-173 can include commands for multiple sequential command streams. Due to factors such as arbitration, bus serialization, host delays, etc., certain pairs of commands in sequential command streams may be "flipped" in the arbitrated queue 132. For example, as shown in FIG. 2B, command D1 precedes command D0 in the arbitrated queue 132, command E2 precedes command E1 in the arbitrated queue 132, etc.

FIG. 2C illustrates more complex jitter than FIGS. 2B or 2A. In particular, FIG. 2C corresponds to an example in which threads can move between processor cores and can have any workload at any given time. As a result, in the arbitrated queue 132 of FIG. 2C, the commands of sequential command streams are further out of order than the "flips" shown in FIG. 2B. For example, the order of commands for sequential command stream D has become D2, D0, D5, D1, D3, D4, . . . , and may be interleaved with other such out of order command streams and random commands.

As described with reference to FIG. 1, the present disclosure provides systems and methods of detecting each of the sequential command streams illustrated in FIGS. 2A-2C without having to rely on the device issuing the commands (e.g., the access device 170) to provide an indication that a particular set of commands corresponds to a sequential command stream. An example of detecting the sequential command stream D of FIG. 2C is described with reference to FIGS. 3-5, although it is to be understood that the described techniques may also be used to detect sequential command streams with only "flipped" commands (e.g., as shown in FIG. 2B) and/or in-order interleaved sequential command streams (e.g., as shown in FIG. 2A).

In a particular aspect, to detect out of order command streams that may be received across multiple queues, the memory 104 may be logically divided into buckets. For example, FIG. 3A illustrates an example in which each bucket includes 64 LBAs, although it is to be understood that in alternative examples, buckets may include a different number of LBAs.

In a particular example, each bucket (e.g., group of 64 LBAs) is associated with a key value that may be unique to the bucket or may be common amongst multiple buckets. Each of the key values may correspond to a stream detector data structure, and each stream detector data structure may include a bitmap (e.g., one of the bitmaps 136 of FIG. 1). Thus, like a key value, a stream detector data structure may be unique to a bucket or may be common amongst multiple buckets. When a command specifying a starting LBA (SLBA) is received, the stream detector data structure for the bucket that the SLBA is included in may be determined by performing a hash function on the SLBA or a quantity derived therefrom, as further described with reference to FIG. 3C. If the bitmap in the identified stream detector data structure is not yet "full," a bit of the bitmap may be asserted, as further described with reference to FIG. 3C.

Figure 3A:
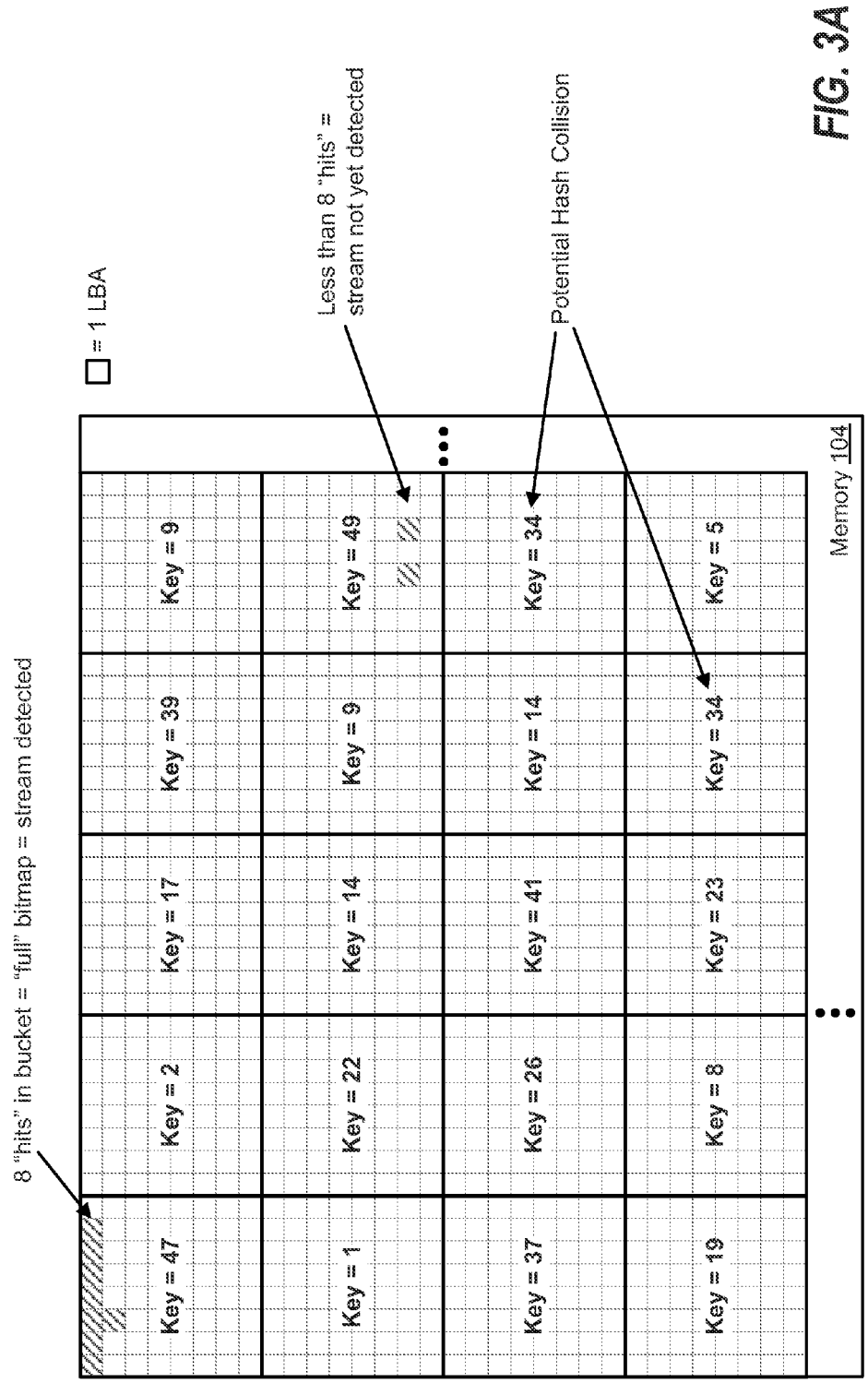
FIG. 3A illustrates a particular example of mapping LBA ranges (e.g., buckets) to key values using a hash function.

In the example of FIG. 3A, bitmaps are 8 bits in length, and a stream directed to a first bucket corresponding to Key value=47 has been detected because at least eight commands indicating SLBAs in the bucket have been received (as illustrated using a hatching pattern). It is noted that the 8 SLBAs that were received prior to detection of the stream were not consecutive. Thus, the present disclosure enables detection of a sequential stream even if the commands that result in "filling up" a bitmap are not directed to sequential LBAs. In FIG. 3A, streams have not yet been detected for the buckets corresponding to Key value=9 and Key value=49, because the 8-bit bitmaps for those buckets are not yet "full."

When the memory 104 is small, the hash function may be selected such that each key value, and therefore stream detector data structure, is unique to a single bucket of LBAs. However, when the size of the memory 104 is large, maintaining a unique stream detector data structure for each bucket of LBAs may not be feasible. In such scenarios, the hash function may be selected to permit potential hash collisions. A potential hash collision may occur when received commands are directed to different LBA buckets that hash to the same key value, such as Key value=34 in the example of FIG. 3A. Resolution of such hash collisions is described with reference to FIG. 7.

Figure 3B:
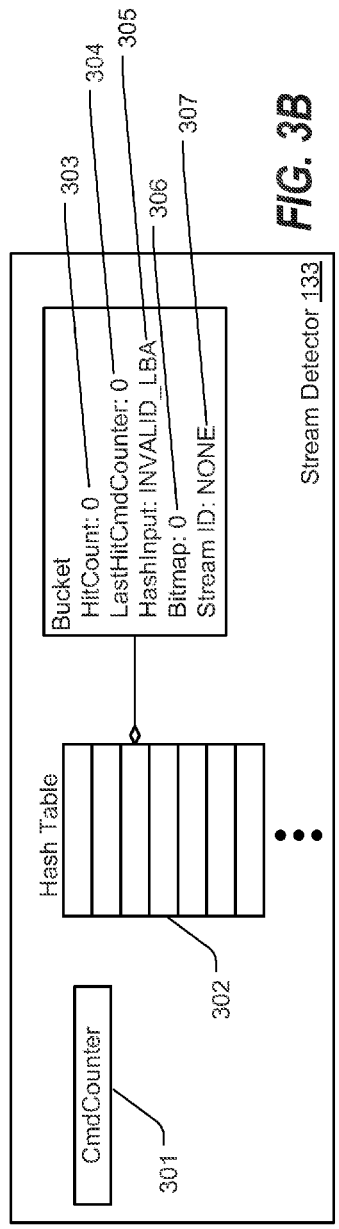
FIG. 3B illustrates a particular example of data structures and variables that may be maintained by a stream detector.

In a particular example, as shown in FIG. 3B, the stream detector 133 maintains a command counter ("CmdCounter") 301 and a table 302 of stream detector data structures ("Bucket"). Each of the stream detector data structures includes a bitmap 306 (e.g., one of the bitmaps 136 of FIG. 1) and a hit count ("HitCount") 303 indicating the number of asserted bits (e.g., 1s) in the bitmap. Each of the stream detector data structures also includes a last hit command counter (LastHitCmdCounter) 304, a hash input ("HashInput") 305, and a stream identifier ("StreamID") 307. In a particular example, the command counter 301 and the stream detector data structures in the table 302 may be initialized based on the following C-style code:

```
//define constants
const EXPIRED_COUNT = 128; //number of commands before
a stream expires
const INVALID_LBA = 0xFFFFFFFF
const LBA_SIZE = 512; //LBA size is 512 bytes (B)
const COMMAND_SIZE = 4096; //each command is directed
to 4 kilobytes (KB)
const BITMAP_SIZE = 8; /*bitmaps are 8 bits long, so sequential
command stream is
    detected after 8 "hits" in the corresponding LBA range*/
const BITMAP_FULL = 0xFF; //FF is hexadecimal for a string of eight 1s
//initialize values
CmdCounter=0;
for(int i=0; i<Table.size( ); ++i) { //e.g., Table.size( ) = 128
  Table[i].HitCount=0;
  Table[i].LastHitCmdCounter = (0 − EXPIRED_COUNT);
  Table[i].HashInput = INVALID_LBA;
  Table[i].Bitmap = 0; //all bits of bitmap initialized to zero
  Table[i].StreamID = NONE; /*streamID is not assigned until
  stream is detected, i.e.,
    after bitmap is full*/
}
```

Figure 3C:
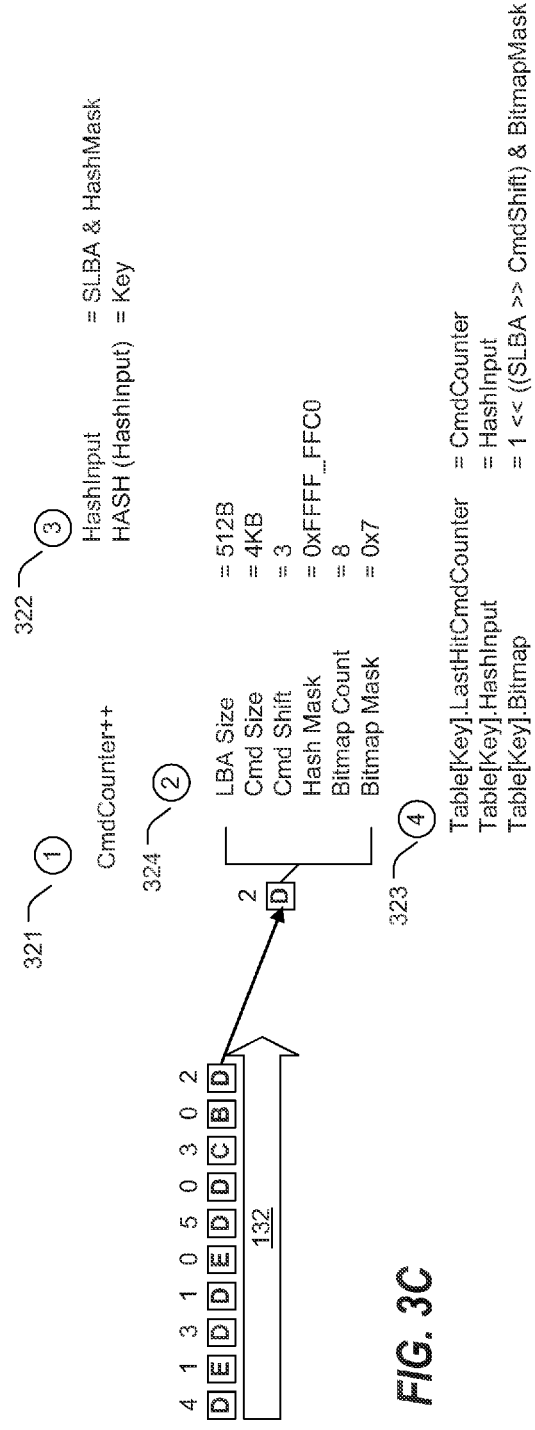
FIG. 3C illustrates a particular example of updating the data structures of FIG. 3B while performing operations to detect a sequential command stream.

Continuing to FIG. 3C, the command stream D of FIG. 2C may be detected as follows. When command D2 is retrieved from the arbitrated queue 132, the command counter 301 may be incremented, as shown at 321. The command counter 301 may thus be an atomically increasing counter that can be used to track how many commands have been retrieved from the arbitrated queue. The command counter 301 may also be used to determine whether a stream has expired, as further described herein.

As described with reference to FIG. 3A, a hash function may be used to map LBA buckets to stream detector data structures. In a particular example, LBA size, command size, and bitmap size can be used to determine a hash mask, where the hash mask is applied to a LBA of a command to mask out lower order address bits of the LBA and identify a LBA bucket that the LBA is included in. For example, the hash mask may be determined by:

$$HashMask = COMMAND\_SIZE * BITMAP\_SIZE / LBA\_SIZE$$

When LBA size is 512 B, command size is 4 KB, and bitmap size is 8 (i.e., 8 hits in a LBA range results in identification of a sequential command stream), the hash mask can be used to define LBA ranges of 64 LBAs, as shown in FIG. 3A. The value of the hash mask may be determined based on command size, bitmap size, LBA size, or any combination thereof. In a particular example, the hash mask value is determined as follows:

```
HashMask = COMMAND_SIZE* BITMAP_SIZE/LBA_SIZE
         = 0xFFF_FFC0
```

The controller 130 may determine a value HashInput by performing a bitwise AND operation on the SLBA indicated by the command being processed with the HashMask value, and may determine a Key value by performing a hash function on the Key value, as shown at 322:

```
HashInput = SLBA & HashMask;
Hash(HashInput) = Key;
```

As described with reference to FIG. 3A, the Key value may be used to determine which stream detector data structure of the table 302 corresponds to the LBA range that includes the LBA indicated by the command. Values within the stream detector data structure may then be updated, as shown at 323:

```
Table[Key].LastHitCmdCounter = CmdCounter;
Table[Key].HashInput = HashInput;
/*assert appropriate bit of bitmap to reflect that the command currently
being processed fell into this particular LBA bucket*/
Table[Key].Bitmap = 1 << ((SLBA >> CmdShift) & BitmapMask;
```

In the illustrated example, because LBA size is 512 B, command size is 4 KB, and each bit of each bitmap represents a 4 KB command, the LBA indicated by an individual command can be shifted 3 bits to align to a 4 KB boundary (corresponding to 8 LBAs). Thus, for the illustrated example, CmdShift=3, and BitmapMask=0x7, as shown at 324.

Figure 4:
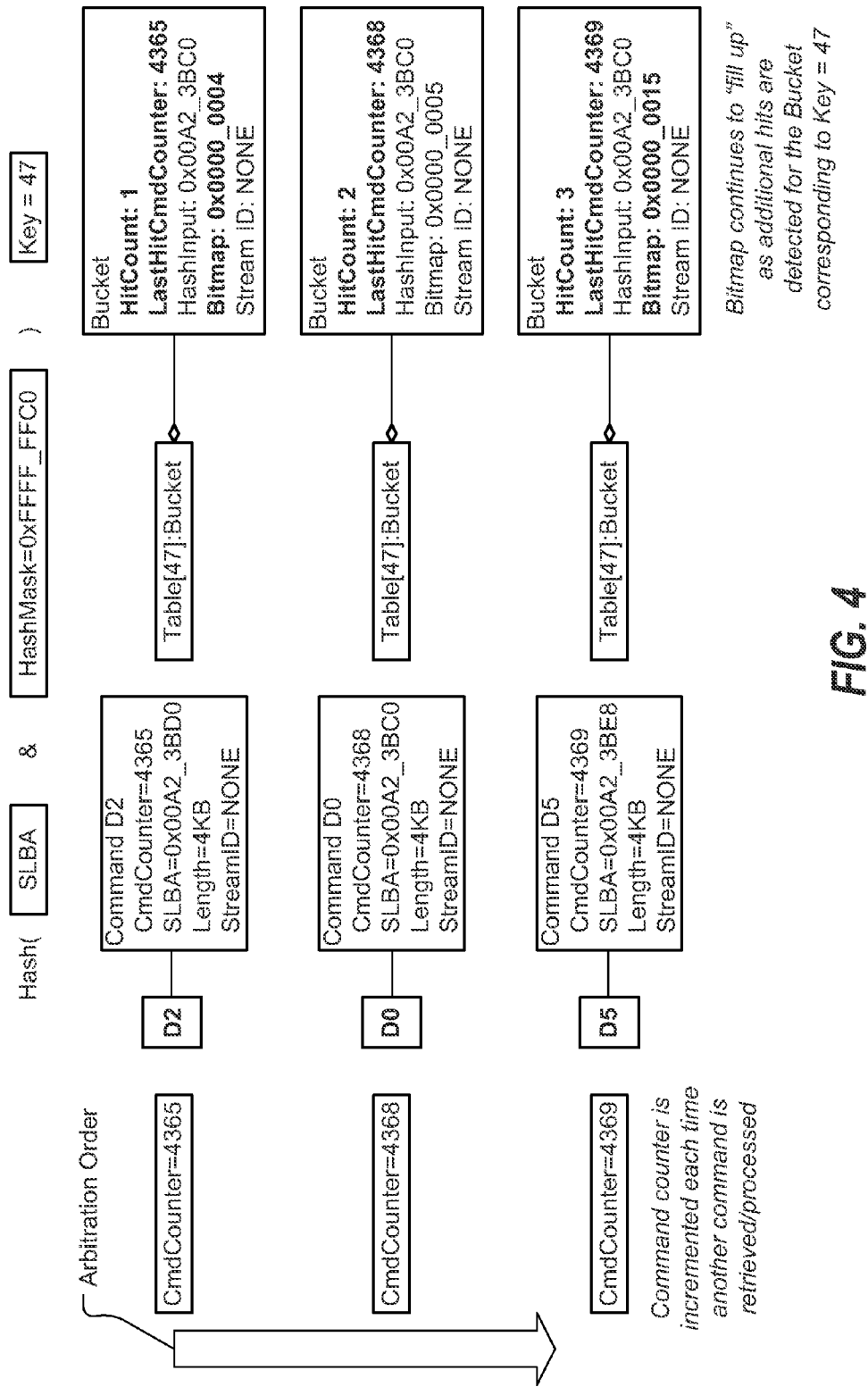
FIG. 4 illustrates additional examples updating the data structures of FIG. 3B while performing operations to detect a sequential command stream.

As additional commands are retrieved from the arbitrated queue 132 and processed, the above operations may be repeated and additional bits of bitmap(s) may be asserted. FIG. 4 illustrates updates to the stream detector data structure as additional commands for sequential command stream D are processed. When processing command D0, which follows command D2, operations may include:

```
///all commands in a particular LBA range should hash to the same value
if(Table[Key].HashInput == HashInput) {
  Table[Key].HitCount += 1;
  Table[Key].LastHitCmdCounter = CmdCounter;
  Table[Key].HashInput = HashInput;
  //in next statement, '|' is the bitwise OR operator
  Table[Key].Bitmap |= 1 << ((SLBA >> CmdShift) & BitmapMask);
}
If(Table[Key].Bitmap == BITMAP_FULL)
  //tag stream (i.e., assign a value to Table[Key].StreamID)
```

Figure 5:
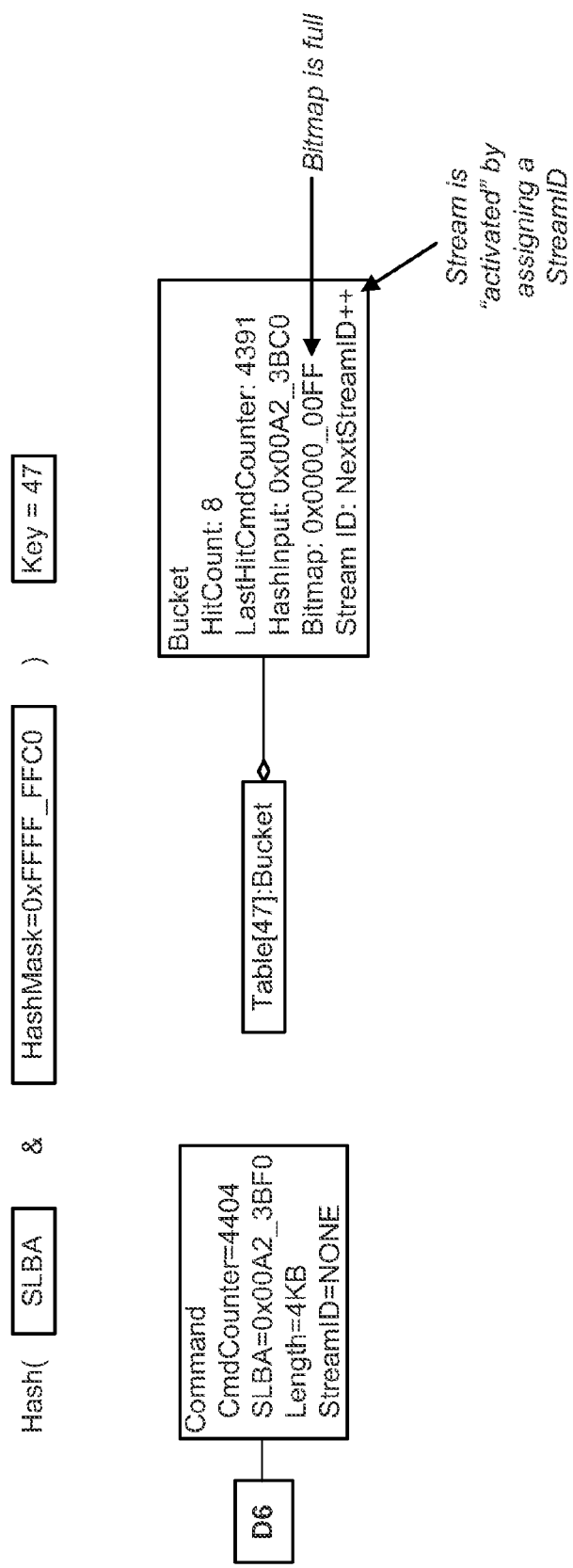
FIG. 5 illustrates a particular example of determining that a sequential command stream has been detected based on values stored in the data structures of FIG. 3B.

When a bitmap is "full," a sequential command stream may be detected and "tagged" with a stream ID. For example, FIG. 5 illustrates operations performed when processing command D6, which is the eighth command of the sequential command stream D. Thus, as shown in FIG. 5, command D6 results in the bitmap becoming full. In response, a stream ID may be assigned to the bucket. Subsequent commands directed to the same LBA bucket may be processed according to different techniques than used for processing discrete or "random" commands that are not part of a sequential command stream, as described with reference to FIG. 1.

Thus, as described with reference to FIGS. 3-5, the present disclosure enables detection of sequential command streams, even when commands of the stream are received out of order and/or via different queues. Advantageously, the stream detection can be performed with a relatively small memory footprint (e.g., memory allocated to the above-described constant values and the table 302) and with little processing overhead. The described techniques may also be tuned based on processing conditions. For example, the hash function and size of the table 302 may be selected to balance between memory cost and probability of hash collisions. The size of the bitmaps can be varied so that streams are recognized after 4 hits, 8 hits, 16 hits, 32 hits, etc. Command size, queue depth, etc. may also be adaptively varied to tune the stream detection algorithm.

Further, because the described techniques involve performing a particular number of constant order (O(1)) operations, stream detection may be performed in real-time or near-real-time with respect to commands being added and retrieved from the arbitrated queue 132. It will also be appreciated that "random" commands may be unimpacted by the described techniques, because streams may not be detected for such random commands.

Figure 6A:
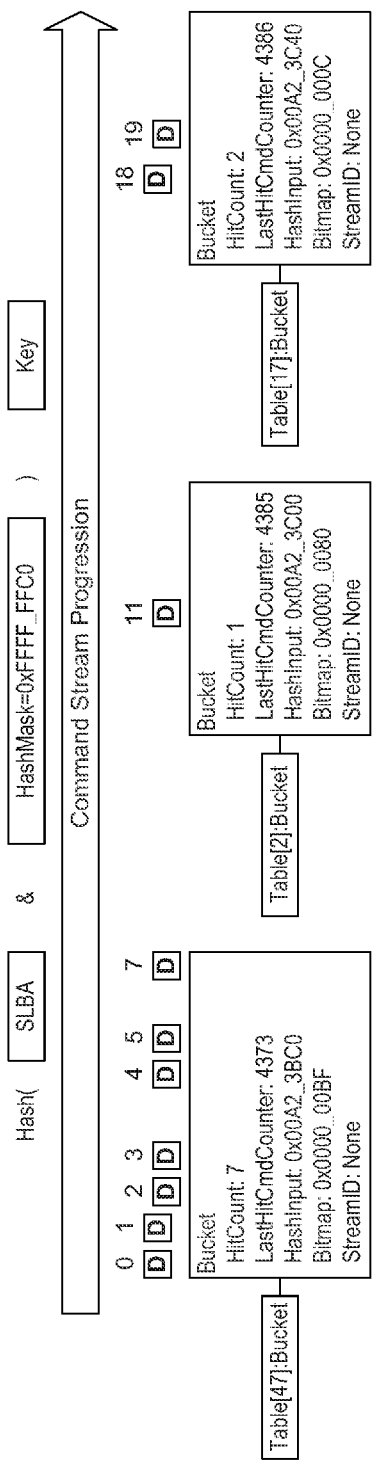
FIGS. 6A and 6B illustrate a particular example of associating neighboring LBA ranges (e.g., buckets) with a single sequential command stream.
Figure 6B:
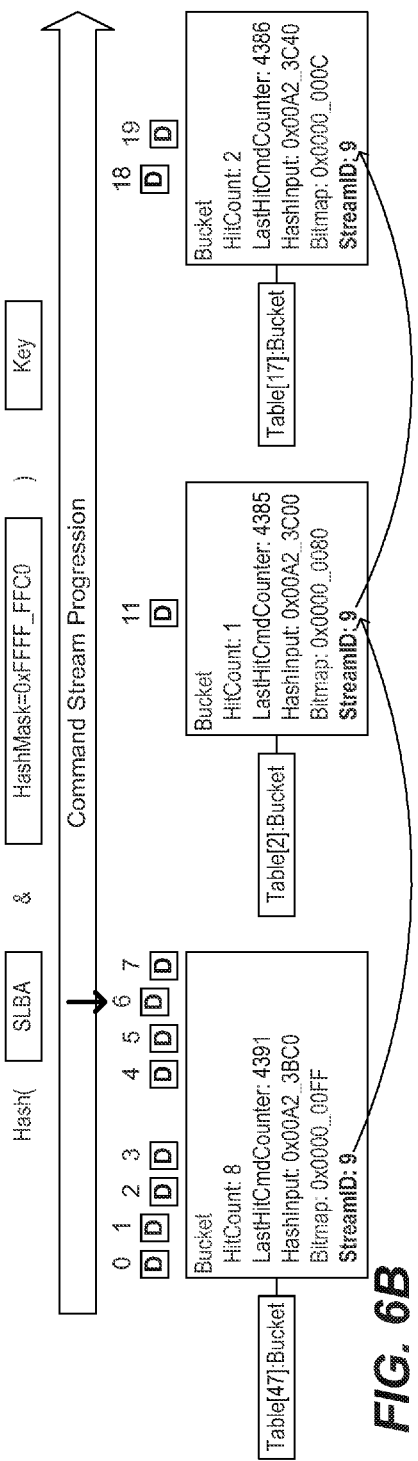

In some examples, when a stream is detected and a stream ID is assigned to a bucket, the same stream ID may also be assigned to additional buckets that have "neighboring" hash inputs, under the assumption that a single larger sequential command stream directed to multiple LBA buckets is being received and processed at the data storage device 102. To illustrate, FIG. 6A depicts a scenario in which the bitmaps in buckets for Key value=2 and Key value=17 are partially filled and where the buckets and have hash inputs ("0x00A2_3C00" and "0x00A2_3C40") that neighbor (e.g., succeed) the hash input ("0x00A2_3BC0") of the bucket for Key value=47. As shown in FIG. 6B, when a stream ID is assigned to the bucket for Key value=47, the same stream ID may be assigned to the "neighboring" buckets for Key value=2 and Key value=17. For example, the controller 130 may hash forward to next LBA bucket(s) and set the stream ID for the previous and next LBA buckets. In a particular aspect, the controller 130 may hash to additional LBA buckets and assign the same stream ID to such buckets a fixed number of times, upto a threshold number of times, until a criterion is met, etc. To illustrate, the controller 130 may continue to assign the same stream ID to additional buckets until a bucket with a different stream ID or with a non-neighboring hash input is identified.

Figure 6C:
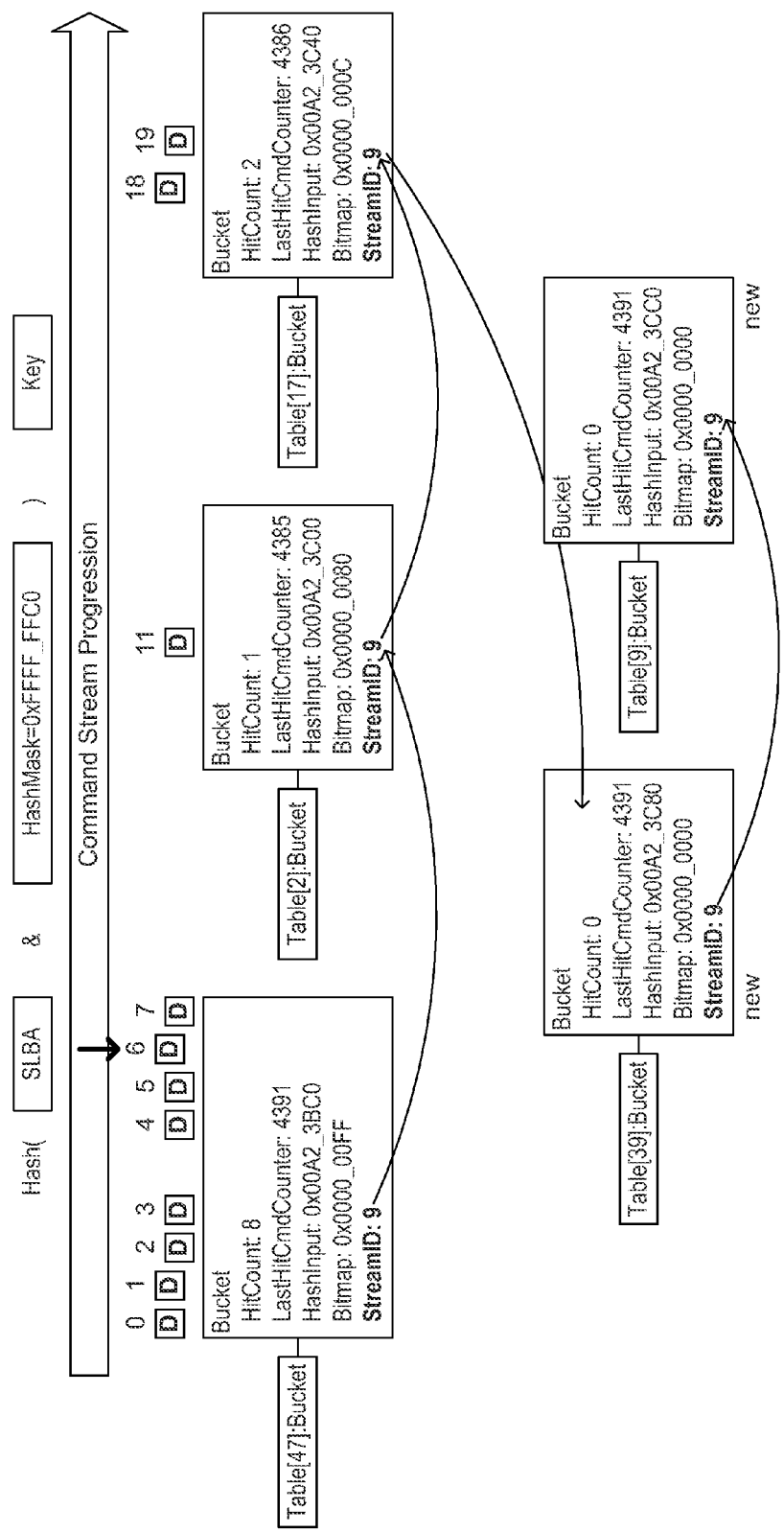
FIG. 6C illustrates a particular example of reserving additional LBA ranges (e.g., buckets) for a detected sequential command stream.

In a particular aspect, established streams are given priority over new streams. For example, as shown in FIG. 6C, surrounding LBA buckets for Key value=39 and Key value=9, which have empty bitmaps, may be "reserved" by setting Stream ID values. It is noted that the bitmaps for the reserved LBA buckets may remain unchanged (e.g., empty). Leaving the bitmaps for the reserved LBA buckets unchanged may enable allocation of new LBAs in a stream, which may improve grouping LBAs together as the LBAs are received (e.g., in read and/or write commands). Further, association with host-specified streams as defined by an industry standard, such as a variant of the NVMe standard (e.g., NVMe 1.2) may be enabled.

Figure 7:
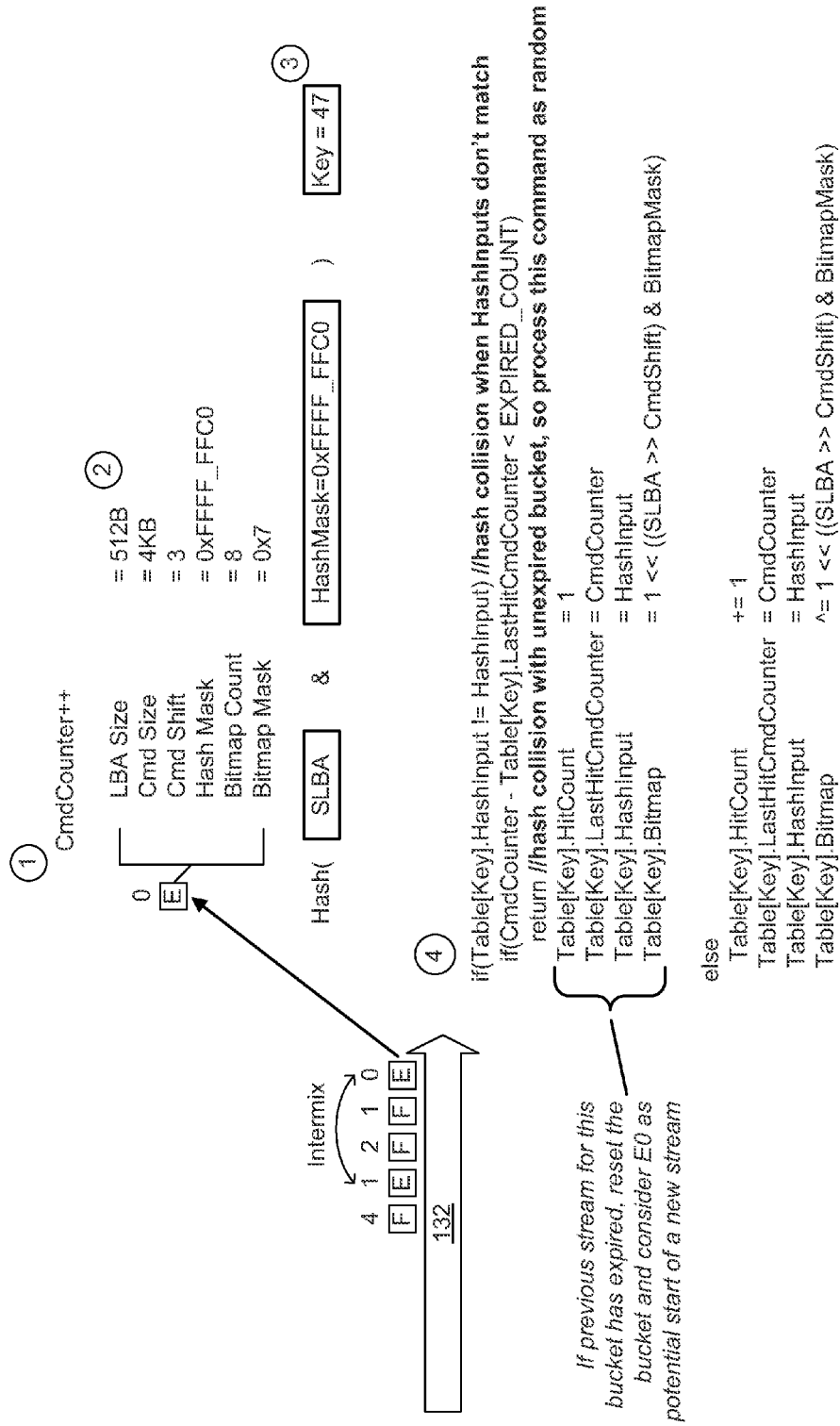
FIG. 7 illustrates a particular example of operations performed to detect a sequential command stream when a potential hash collision is determined.

In a particular aspect, as described with reference to FIG. 1, the stream expiration logic 135 may "reset" a LBA bucket if a threshold number of commands have been receive since the last hit in the LBA bucket. For example, FIG. 7 illustrates an example in which a command E0, which is not part of the sequential command stream D, causes a hash collision by hashing to the same stream detector data structure for Key value=47 as the previously received commands for the sequential command stream D. If the hash collision is with a stream detector data structure for an active, unexpired stream, the command E0 may be processed as a random command. As shown in FIG. 7, a stream may be considered expired when the difference between a current value of the command counter 301 and the last hit command counter 304 in the stream detector data structure exceeds a threshold (e.g., EXPIRED_COUNT). If the previously detected stream has expired, the stream detector data structure may be reset and the command E0 may be considered the start of a potential new stream.

Figure 8:
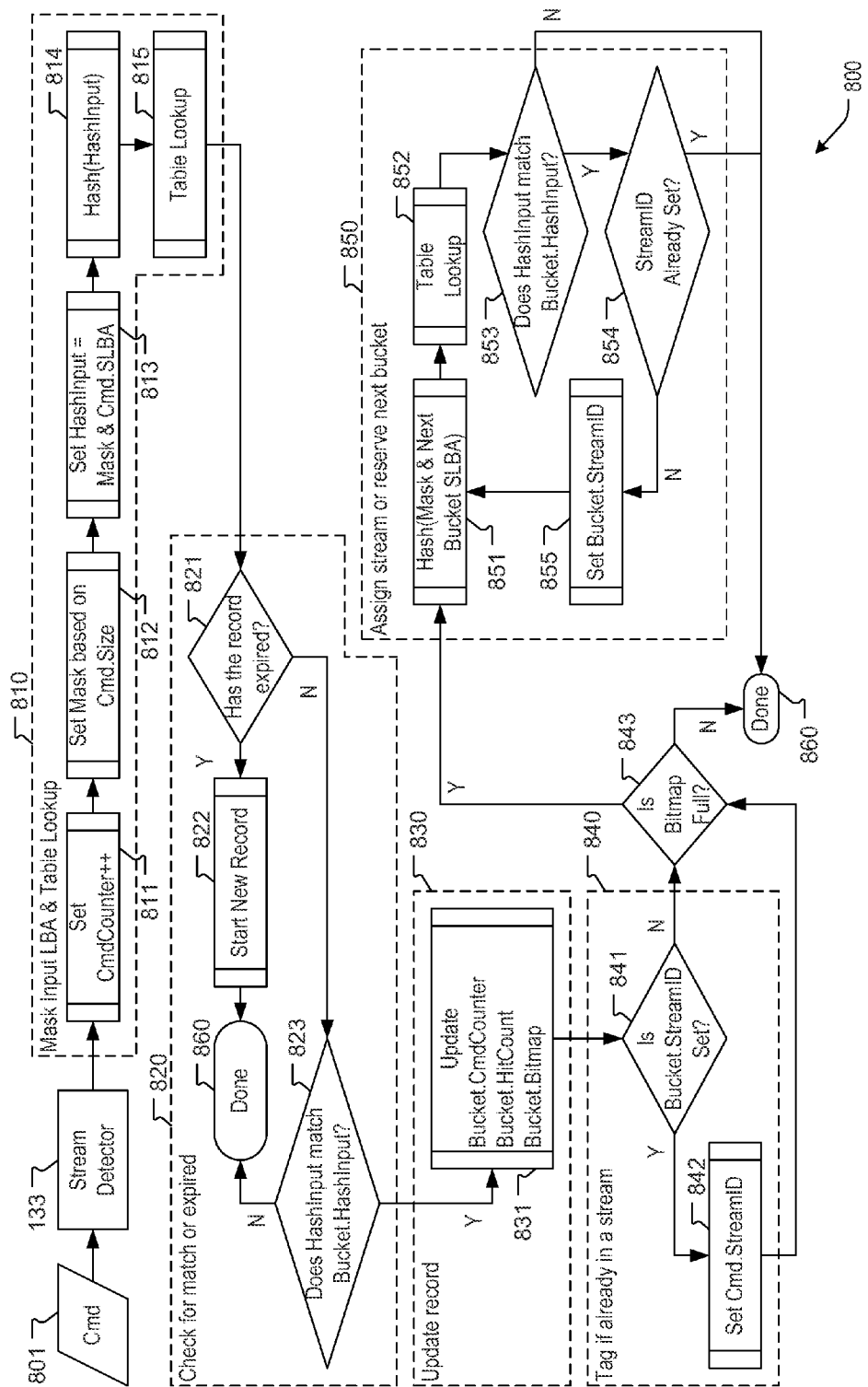
FIG. 8 is a flowchart to illustrate a particular example of a method of detecting a sequential command stream.

Referring to FIG. 8, a particular illustrative example of a method is depicted and generally designated 800. In an illustrative example, the method 800 may be performed at the data storage device 102 of FIG. 1.

The method 800 may include receiving a command 801 at the stream detector 133. For example, the command 801 may be one of the commands 141-143, one of the commands illustrated in FIGS. 2-7, etc. The stream detector 133 may perform various operations, as shown in FIG. 8, to determine whether the command 801 is part of a sequential command stream. For example, the stream detector 133 may perform masking and table lookup operations 810, match/expiration check operations 820, update operations 830, tagging operations 840, and/or assignment/reservation operations 850.

For example, at 811, a command counter may be incremented to reflect receipt of the command 801. At 812, a mask may be determined based on a size of the command 801. Continuing to 813, a hash input value may be calculated by performing a bitwise AND operation on the mask and SLBA of the command 801. A key value may be calculated by performing a hash function on the hash input, at 814, and a table lookup may be performed based on the key value, at 815. In an illustrative example, determining the key value may include performing the operations shown at 322 of FIG. 3C.

Continuing to 821, the method 800 may include determining whether a record (e.g., a stream detector data structure for the bucket corresponding to the command 801) has expired. If so, the method 800 may include starting a new record (e.g., resetting or restarting the stream detector data structure for the bucket), at 822, and the method 800 may then end, at 860. If the record has not expired, the method 800 may include determining whether the hash input matches a hash input stored in the record. If the hash inputs do not match (i.e., the command 801 has caused a hash collision with an unexpired stream), the method 800 may end, at 860. In this situation, the command 801 may be processed as a random command, as described with reference to FIG. 7.

If the hash input matches the hash input stored in the record, this means that the command 801 is part of the same potential sequential command stream that is being tracked using the record. Thus, in this scenario, the method 800 may advance to 831 and update the command counter, the hit count, and the bitmap in the record, as shown. Continuing to 841, the method 800 may include determining if the record has been assigned a stream ID. If so, the command 801 may be tagged with the stream ID assigned to the bucket, at 842, which may cause the command 801 to be processed as part of a sequential command stream, as described with reference to FIG. 1. If the stream ID is not set, the method 800 may include determining if the bitmap has become full due to the update performed at 831. If the bitmap is not yet full, the method 800 may end, at 860.

Alternatively, if the command 801 has caused the bitmap to become full, the method 800 may include determining whether the bucket being examined is a neighboring bucket of a previously detected stream (e.g., existing streams may be given priority over new streams, as described with reference to FIG. 6). To illustrate, the method 800 may include computing a hash of the mask and a next bucket SLBA, at 851, and performing a table lookup of the resulting value to identify another record, at 852. If the hash input value stored in the other record does not match the hash input value determined at 813 for the command 801, the method 800 may end, at 860. Otherwise, the method 800 may determine if the stream ID of the other record is set, at 854. If the stream ID of the other record is set, the method 800 may end, at 860. Otherwise, the method 800 may set the stream ID of the record corresponding to the command 801, at 855. To illustrate, the streamID may be set to the same value as the streamID of the neighboring bucket, because the buckets are neighboring buckets of the same stream. The method 800 may return to 851 to examine additional neighboring buckets.

Figure 9A:
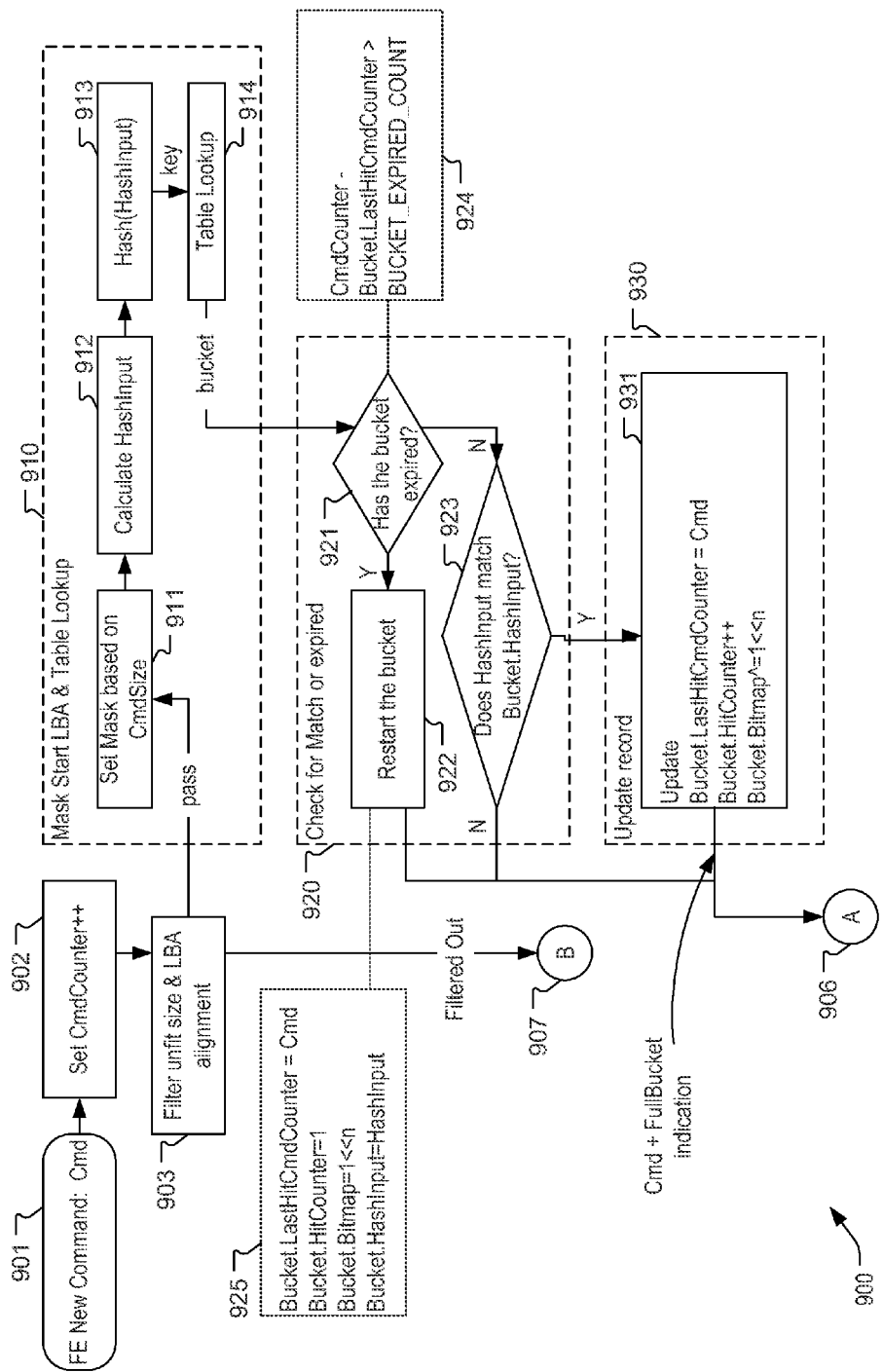
FIGS. 9A and 9B collectively depict a flowchart to illustrate another particular example of a method of detecting a sequential command stream.
Figure 9B:
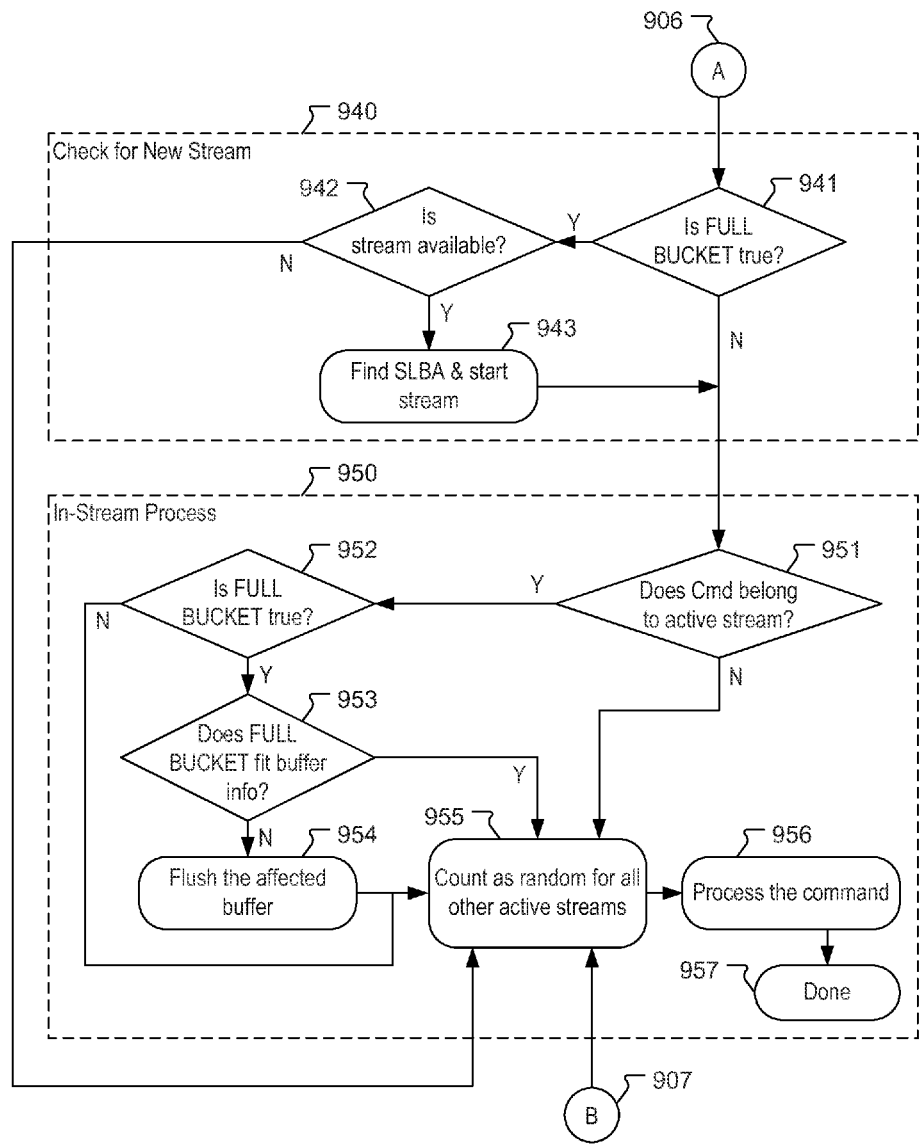

Referring to FIGS. 9A and 9B, a particular illustrative example of a method is depicted and generally designated 900. In an illustrative example, the method 900 may be performed at the data storage device 102 of FIG. 1.

The method 900 may include fetching a new command, at 901. For example, the command may be one of the commands 141-143, one of the commands illustrated in FIGS. 2-7, etc. The method 900 may also include incrementing a command counter, at 902, and performing a filtering operation to determine if the fetched command has a size or LBA alignment that is incompatible with stream detection, at 903. For example, commands over a certain size, e.g., 128 KB, may be excluded from stream detection because such commands may not benefit as much from the operations performed for sequential command stream (e.g., RLA, write parallelism, buffering, etc.). If the command is filtered out, the method 900 may advance to node B 907. If the command passes the filtering operation, the method 900 may include performing masking and lookup operations 910, match/expiration check operations 920, update operations 930, new stream check operations 940, and/or in-stream processing operations 950.

For example, the method 900 may include setting a mask based on a size of the fetched command, at 911, and calculating a hash input value, at 912. A key value may be determined by performing a hash function on the hash input, at 913, and a table lookup may be performed on the key value to identify a stream detector data structure (called "bucket" in FIG. 9) corresponding to the fetch command, at 914.

Continuing to 921, the method 900 may include determining if the stream detector data structure corresponds to an expired stream. For example, as shown at 924, determining an expired stream may include determining whether a difference between the command counter (which was incremented at 902) and a last hit command counter of the stream detector data structure exceeds a threshold value. If an expired stream is detected, the method 900 may include restarting (e.g., resetting) the stream detector data structure, at 922, such as by performing the operations shown at 925. If an expired stream is not detected, the method 900 may include determining if the hash input calculated at 912 matches the hash input stored in the stream detector data structure. If not, the method 900 may advance to node A 906. If the hash inputs match, the method 900 may include updating the stream detector data structure, at 931. For example, updating the stream detector data structure may include updating the last hit command counter, the hit counter, and the bitmap of the stream detector data structure, as shown. The method 900 may then continue to node A 906.

Referring to FIG. 9B, the method 900 may advance from node A 906 to determine if the bitmap of the stream detector data structure is full, at 941. If so, the method 900 may include determining if a stream is available, at 942. In an illustrative example, a stream may be available unless a system memory constraint that limits the total number of allocated streams has been reached. If the stream is available, the method 900 may include finding an SLBA of the fetched command and starting the stream, at 943.

If the bitmap of the stream detector data structure is not full, or after starting the stream, the method 900 may include determining if the fetched command belongs to an active stream, at 951. If so, the method 900 may include determining if the stream detector data structure is full, at 952. For example, it may be possible that the stream data structure associated with the current SLBA is not full even though a stream has been allocated, because the stream may have been allocated when a previous stream data structure was filled. Thus, the determination at 951 may be reached regardless of whether the current stream data structure is full. If it is determined at 952 that the stream data structure is full, the method 900 may include determining if the "full bucket," e.g., the currently fetched and one or more previously fetched commands that are directed to the LBAs corresponding to the "full bucket" fits into buffer information (e.g., a buffering data structure), at 953. For example, the buffering data structure may correspond to one of the buffers 137 of FIG. 1. If it is determined at 953 that the full bucket fits into the buffering information, if it is determined at 951 that the command does not belong to an active stream, if the command was filtered out at 903, if it is determined at 942 that a stream is unavailable, or if it is determined at 952 that the stream data structure is not full, the method 900 may include counting the fetched command as a random command for all other active streams, at 955, and processing the command, at 956. The method 900 may end, at 957. If the full bucket does not fit into the buffer information, the method 900 may include flushing the affected buffer (e.g., upon a number of buffered read or write operations in the buffer exceeding a threshold or after a timeout period elapses), at 954, and may then advance to 955. The method 900 may also advance from 952 to 955 if it is determined, at 952, that the bucket was not full.

Figure 10:
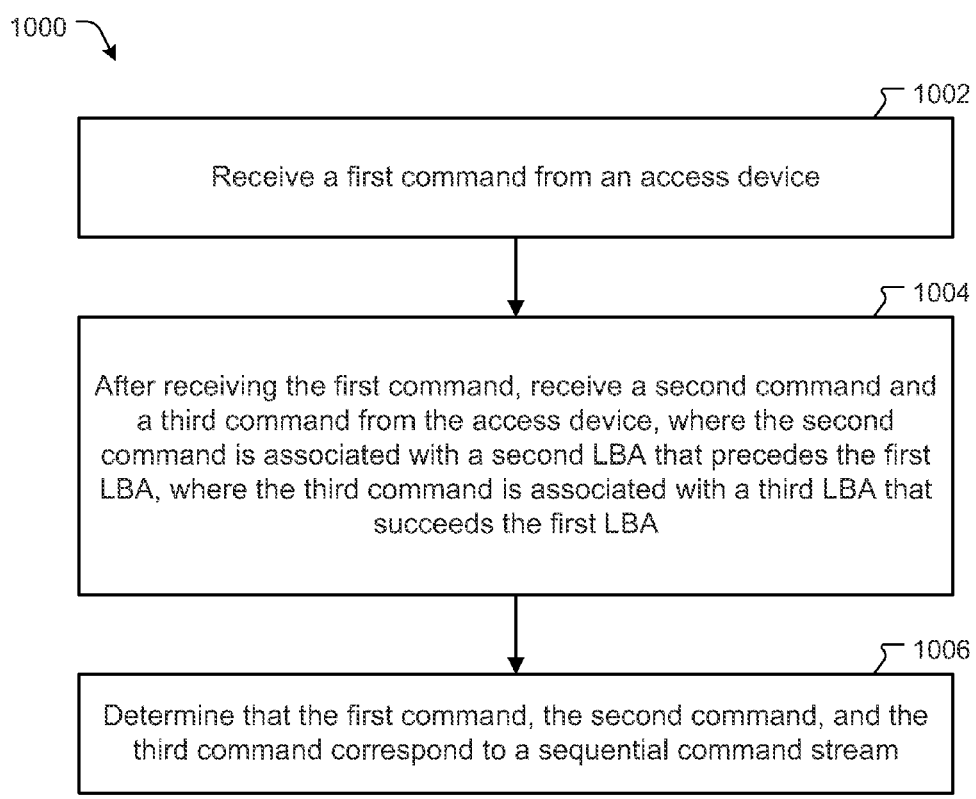
FIG. 10 is a flowchart to illustrate another particular example of a method of detecting a sequential command stream.

Referring to FIG. 10, a particular illustrative example of a method is depicted and generally designated 1000. In an illustrative example, the method 1000 may be performed at the data storage device 102 of FIG. 1.

The method 1000 may include receiving a first command from an access device, at 1002. The first command may be associated with a first LBA. For example, referring to FIG. 1, the controller 130 may receive the first command 141, where the first command 141 is associated with a first LBA (e.g., LBA3).

The method 1000 may also include, after receiving the first command, receive a second command and a third command from the access device, at 1004. The second command may be associated with a second LBA that precedes the first LBA and the third command may be associated with a third LBA that succeeds the first LBA. In some examples, at least two of the commands are received via the same command queue. In some examples, at least two of the commands are received via different command queues. Thus, the method 1000 of FIG. 10 may be used to detect sequential command streams in both single-queue as well as multi-queue systems. For example, referring to FIG. 1, the controller 130 may receive the second command 142 and the third command 143. The second command 142 may be associated with a second LBA (e.g., LBA1) that precedes the first LBA (e.g., LBA3), and the third command 143 may be associated with a third LBA (e.g., LBA4) that succeeds the first LBA (e.g., LBA3).

The method 1000 may further include determine that the first command, the second command, and the third command correspond to a sequential command stream, at 1006. For example, referring to FIG. 1, the stream detector 133 may determine that the commands 141-143 correspond to a sequential command stream directed to at least the first LBA range 105. In an illustrative example, the controller 130 may determine that the commands 141-143 correspond to a sequential command stream based on one or more operations described with reference to FIGS. 3-9.

Figure 11:
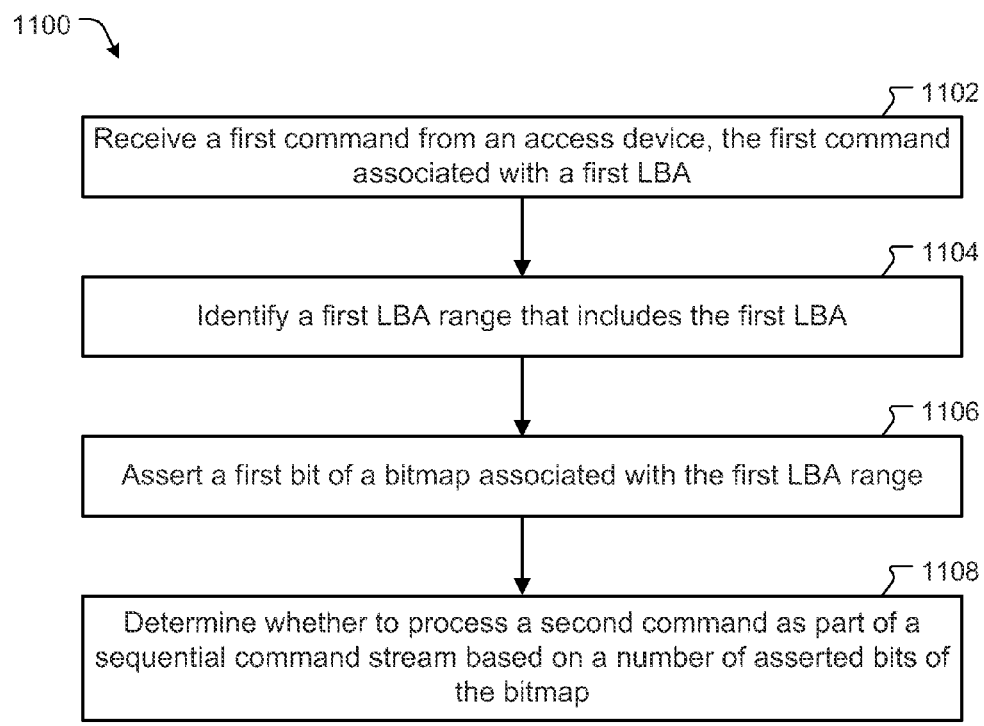
FIG. 11 is a flowchart to illustrate another particular example of a method of detecting a sequential command stream.

Referring to FIG. 11, a particular illustrative example of a method is depicted and generally designated 1100. In an illustrative example, the method 1100 may be performed at the data storage device 102 of FIG. 1.

The method 1100 may include receiving a first command from an access device, at 1102, where the first command is associated with a first LBA. For example, referring to FIG. 1, the controller 130 may receive the first command 141.

The method 1100 may also include identifying a first LBA range that includes the first LBA, at 1104, and asserting a first bit of a bitmap associated with the first LBA range, at 1106. The first bit may correspond to the first LBA. For example, referring to FIG. 1, the hashing logic 134 may identify an LBA range (e.g., bucket) corresponding to the first LBA, and may assert a bit of the bitmap 136 associated with the LBA range. In an illustrative example, a LBA bucket and corresponding stream detector data structure may be determined based masking, hashing, and table lookup operations, as described with reference to FIGS. 3-5.

The method 1100 may further include determining whether to process a second command as part of a sequential command stream based on a number of asserted bits of the bitmap, at 1108. For example, after the bitmap 136 corresponding to the bucket for the first command 141 becomes full, additional commands directed to the first LBA range 105 may be processed as part of a sequential command stream, as described with reference to FIG. 1.

In a particular aspect, a non-volatile memory system suitable for use in implementing aspects of the disclosure may be coupled to an access device. The non-volatile memory system includes a controller and a non-volatile memory that is made up of one or more non-volatile memory dies. As used herein, the term "memory die" refers to the collection of non-volatile memory cells, and associated circuitry for managing the physical operation of those non-volatile memory cells, that are formed on a single semiconductor substrate. The controller interfaces with the access device and transmits command sequences for read, program, and erase operations to the one or more non-volatile memory dies. The controller may include the stream detector 133 of FIG. 1.

The controller, which may be a flash memory controller, can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller can be configured with hardware and/or firmware to perform various functions as described herein. Further, some of the components shown in the drawings as being internal to a controller can instead be external to the controller, and/or other components can be used. Additionally, the phrase "operatively in communication with" can mean directly in communication with or indirectly (wired or wireless) in communication with through one or more components, which may or may not be shown or described.

As used herein, a flash memory controller is a device that manages data stored on flash memory and communicates with an access device, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when an access device is to read data from or write data to the flash memory, the host device communicates with the flash memory controller. If the host device provides a logical address (e.g., LBA) to which data is to be read/written, the flash memory controller can convert the logical address received from the host device to a physical address in the flash memory. Alternatively, the host device can provide the physical address. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The one or more non-volatile memory dies may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller and the one or more non-volatile memory dies may be any suitable flash interface, such as Toggle Mode 200, 400, or 800. In one example, the present disclosure may be implemented in a card based system, such as a card that supports universal flash storage (UFS). In an alternate example, the present disclosure is implemented as part of an embedded memory system.

It is to be noted that the present disclosure is not to be limited to a single channel between the controller and the one or more non-volatile memory dies. For example, in some NAND memory system architectures, 2, 4, 8 or more NAND channels may exist between the controller and the NAND memory device, depending on controller capabilities. Thus, in any of the examples described herein, more than a single channel may exist between the controller and the one or more non-volatile memory dies, even if a single channel is shown in the drawings.

In some aspects, a storage module used to implement the techniques of the present disclosure includes multiple non-volatile memory systems. As such, the storage module may include a storage controller that interfaces with an access device and with a storage system that includes a plurality of non-volatile memory systems. The interface between the storage controller and the non-volatile memory systems may be a bus interface, such as a PCIe interface, as an illustrative non-limiting example. The storage module may correspond to a SSD device, such as found in portable computing devices, such as laptop computers, and tablet computers. Each storage controller of the storage module may include the stream detector 133.

In some aspects, the techniques of the present disclosure are incorporated into a hierarchical storage system that includes a plurality of storage controllers, each of which controls a respective storage system. Host systems (e.g., one or more host devices or access devices) may access memories within the hierarchical storage system via a bus interface. In one example, the bus interface may be a NVMe or fiber channel over Ethernet (FCoE) interface. In one example, the hierarchical storage system may be a rack mountable mass storage system that is accessible by multiple host computers, such as would be found in a data center or other location where mass storage is utilized. Each storage controller of the hierarchical storage system may include the stream detector 133.

It is to be understood that a controller, such as the controller 130 of FIG. 1, may include more, fewer, and/or different components than shown. For example, in some aspects, a controller includes a front end module that interfaces with an access device, a back end module that interfaces with the one or more non-volatile memory dies, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

The controller may also include a buffer manager/bus controller that manages buffers in random access memory (RAM) and controls the internal bus arbitration of the controller. A read only memory (ROM) of the controller may store system boot code. In other examples one or both of the RAM and the ROM may be located externally to the controller. In yet other examples, portions of RAM and ROM may be located both within the controller and outside the controller.

The controller may also include a front end module including a host interface and a physical layer interface (PHY) that provide the electrical interface with the host device or next level storage controller. The choice of the type of host interface can depend on the type of memory being used. Examples of host interfaces include, but are not limited to, SCSI, Fibre Channel, PCIe, and NVMe. The host interface typically facilitates transfer for data, control signals, and timing signals.

The Back end module can include an error correction code (ECC) engine that encodes the data received from the host device, and decodes and error corrects the data read from the non-volatile memory. A command sequencer may generate command sequences, such as program and erase command sequences, to be transmitted to the one or more non-volatile memory dies. A Redundant Array of Independent Drives (RAID) module may manage generation of RAID parity and recovery of failed data. The RAID parity may be used as an additional level of integrity protection for the data being written into the one or more non-volatile memory dies. In some cases, the RAID module may be a part of the ECC engine. A memory interface may provide the command sequences to the one or more non-volatile memory die and may receive status information from the one or more non-volatile memory dies. For example, the memory interface may be a double data rate (DDR) interface, such as a Toggle Mode 200, 400, or 800 interface. A flash control layer may control the overall operation of the back end module. In some examples, the back end module includes the stream detector 133.

A storage system may also include a power management module and a media management layer, which performs wear leveling of memory cells of the one or more non-volatile memory dies. Other discrete components, such as external electrical interfaces, external RAM, resistors, capacitors, or other components that may interface with the controller may also be included. In alternative examples, one or more of the PHY interface, the RAID module, the media management layer, and the buffer management/bus controller are optional components that are omitted from the controller.

Non-volatile memory dies may also include more, fewer, and/or different components than shown in FIG. 1. For example, non-volatile memory dies can include peripheral circuitry and a non-volatile memory array, such as the memory 104 including non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry may include a state machine that provides status information to the controller. The peripheral circuitry may also include a power management or data latch control module. The one or more non-volatile memory dies may further include discrete components (as described above), an address decoder, an address decoder, and a data cache that caches data.

Although various components depicted herein are illustrated as block components and described in general terms, such components may include one or more microprocessors, state machines, or other circuits configured to enable the stream detector 133 to operate as described herein. For example, the stream detector 133 may represent physical components, such as hardware controllers, state machines, logic circuits, or other structures.

The stream detector 133 may be implemented using a microprocessor or microcontroller programmed to operate as described herein. In a particular example, the stream detector 133 includes a processor executing instructions (e.g., firmware) that are stored at a non-volatile memory (e.g., the memory 104 or a memory of the controller 130). Alternatively, or in addition, executable instructions that are executed by the processor may be stored at a separate memory location, such as at a ROM.

In a particular example, the data storage device 102 may be implemented in a portable device configured to be selectively coupled to one or more external devices. However, in other examples, the data storage device 102 may be attached or embedded within one or more host devices, such as within a housing of a host communication device. For example, the data storage device 102 may be within a packaged apparatus such as a wireless telephone, a personal digital assistant (PDA), a gaming device or console, a portable navigation device, or other device that uses internal non-volatile memory. In a particular example, the data storage device 102 may include a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

In accordance with a particular aspect of the present disclosure, a data storage device includes a non-volatile memory and a controller coupled to the non-volatile memory. The controller is configured to receive a first command from an access device, the first command associated with a first logical block address (LBA). The controller is also configured to, after receiving the first command, receive a second command and a third command from the access device. The second command is associated with a second LBA that precedes the first LBA, and the third command is associated with a third LBA that succeeds the first LBA. The controller is further configured to determine that the first command, the second command, and the third command correspond to a sequential command stream.

In accordance with another aspect of the present disclosure, a method includes performing operations at a data storage device including a non-volatile memory and a controller coupled to the non-volatile memory. The operations include receiving a first command from an access device, the first command associated with a first LBA. The operations also include identifying a first LBA range that includes the first LBA and asserting a first bit of a bitmap associated with the first LBA range. The operations further include determining whether to process a second command as part of a sequential command stream based on a number of asserted bits of the bitmap.

In accordance with another aspect of the present disclosure, a data storage device includes a non-volatile memory and a controller coupled to the non-volatile memory. The controller is configured to receive a first command from an access device, the first command associated with a first LBA. The controller is also configured to identify a first LBA range that includes the first LBA and to assert a first bit of a bitmap associated with the first LBA range. The controller is further configured to determine whether to process a second command as part of a sequential command stream based on a number of asserted bits of the bitmap.

The illustrations of the embodiments, aspects, and examples described herein are intended to provide a general understanding of the various embodiments, aspects, and examples. Other embodiments, aspects, and examples may be utilized and derived from the disclosure, such that structural and logical substitutions and changes may be made without departing from the scope of the disclosure. This disclosure is intended to cover any and all subsequent adaptations or variations of various embodiments, aspects, and examples.

The above-disclosed subject matter is to be considered illustrative, and not restrictive, and the appended claims are intended to cover all such modifications, enhancements, and other embodiments, aspects, and examples, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
a non-volatile memory; and
a controller coupled to the non-volatile memory, the controller configured to:
  receive a first command from an access device, the first command associated with a first logical block address (LBA);
  determine a first LBA range that includes the first LBA, a hash input value based on the first LBA, a key value corresponding to a hash of the hash input value, and a stream detector data structure that is associated with the key value and that includes a last hit command counter; and
  determine, based on a number of asserted bits of a bitmap that is associated with the first LBA range, that the first command and a second command that is received after the first command and that is associated with a second LBA correspond to a sequential command stream.

2. The data storage device of claim 1, wherein the controller is further configured to:
determine that a third command associated with a third LBA that succeeds the first LBA is included in the sequential command stream prior to receiving a fourth command of the sequential command stream, wherein the sequential command stream includes the first command and the second command, and wherein the fourth command is associated with a fourth LBA that precedes the third LBA and that succeeds the first LBA; and
associate a stream ID with the sequential command stream in response to determining that a group of LBAs including at least one of the first LBA, the second LBA, the third LBA, or the fourth LBA corresponds to the sequential command stream.

3. The data storage device of claim 1, wherein the non-volatile memory comprises a solid-state drive (SSD) device, and further comprising:
identifying an LBA range based on the first LBA; and
determining that the sequential command stream is directed to the identified LBA range.

4. The data storage device of claim 1, wherein:
the non-volatile memory comprises a NAND flash memory, and
the first command, the second command, and a third command are sequential commands received out of order via an interface configured to communicate commands via multiple command queues.

5. The data storage device of claim 1, wherein the first command is received via a first command queue, wherein at least one of the second command or a third command is received via a second command queue, and further comprising determining whether each of the first LBA, the second LBA, and a third LBA associated with the third command is included in one of a first identified LBA range or a second identified LBA range.

6. The data storage device of claim 5, wherein the first command is received via a first command queue, wherein at least one of the second command or a third command is received via a second command queue, and wherein the controller is further configured to insert commands received via the first command queue into a single arbitrated queue and to insert commands received via the second command queue into the single arbitrated queue.

7. The data storage device of claim 1, wherein the sequential command stream is associated with a particular LBA range that includes the first LBA, the second LBA, and a third LBA associated with a third command, and wherein the controller is further configured to:
receive a fourth command after detecting the sequential command stream, the fourth command associated with a fourth LBA;
determine that the fourth LBA is included in the particular LBA range; and
determine that the fourth command is part of the sequential command stream based on determining that the fourth LBA is included in the particular LBA range, wherein the sequential command stream includes the first command, the second command, and the third command.

8. An apparatus, comprising:
means for receiving a first command from an access device, the first command associated with a first logical block address (LBA); and
means for performing operations, the means for performing operations configured to determine each of a first LBA range that includes the first LBA, a hash input value based on the first LBA, and a key value corresponding to a hash of the hash input value, to identify, based on the key value, a stream detector data structure that includes a last hit command counter, to assert a first bit of a bitmap associated with the first LBA range, and to determine that a second command is part of a sequential command stream that includes the first command based on a number of asserted bits of the bitmap.

9. The apparatus of claim 8, wherein the hash input value is based further on a mask value, and wherein the means for performing operations is further configured to mask lower order bits of the first LBA based on the mask value to identify the first LBA range.

10. The apparatus of claim 9, wherein the mask value is based on a command size associated with the first command, a size of the bitmap, an LBA size, or any combination thereof.

11. A method comprising:
at a data storage device including a non-volatile memory and a controller coupled to the non-volatile memory, performing:
receiving a first command from an access device, the first command associated with a first logical block address (LBA);
determining each of a first LBA range that includes the first LBA, a hash input value based on the first LBA, and a key value corresponding to a hash of the hash input value;
identifying a stream detector data structure based on the key value, wherein the stream detector data structure includes a last hit command counter;
asserting a first bit of a bitmap associated with the first LBA range; and
determining that a second command is part of a sequential command stream that includes the first command based on a number of asserted bits of the bitmap.

12. The method of claim 11, wherein the hash input value is determined based further on a mask value, and wherein the mask value is based on a command size associated with the first command, a size of the bitmap, an LBA size, or any combination thereof.

13. The apparatus of claim 8, wherein the means for performing operations is further configured to set the last hit command counter to a first command counter value, the last hit command counter configured to indicate an expiration of the sequential command stream in response to a value of the last hit command counter indicating a threshold number of received commands.

14. The apparatus of claim 13, wherein the sequential command stream expires in response to at least a threshold number of commands being received after setting the last hit command counter to the first command counter value.

15. The apparatus of claim 8, wherein the means for performing operations is further configured to determine whether the first LBA is included in one of a first identified LBA range or a second identified LBA range and whether a second LBA associated with the second command is included in one of the first identified LBA range or the second identified LBA range.

16. The apparatus of claim 8, wherein the second command is a write command, and wherein the means for performing operations is further configured to:
buffer write operations corresponding to the sequential command stream in a buffer; and
flush a buffer responsive to a number of buffered write operations in the buffer exceeding a threshold or after a timeout period elapses.

17. The apparatus of claim 8, wherein the second command is a read command, and wherein the means for performing operations is further configured to perform a read look ahead operation for a third LBA that is sequential with respect to a second LBA associated with the second command based on determining that the second command is part of the sequential command stream.

18. A data storage device comprising:
a non-volatile memory; and
a controller coupled to the non-volatile memory, the controller configured to:
receive a first command from an access device, the first command associated with a first logical block address (LBA);
determine each of a first LBA range that includes the first LBA, a hash input value based on the first LBA, and a key value corresponding to a hash of the hash input value, to identify, based on the key value, a stream detector data structure that includes a last hit command counter;
assert a first bit of a bitmap associated with the first LBA range; and
determine that a second command is part of a sequential command stream that includes the first command based on a number of asserted bits of the bitmap.

19. The data storage device of claim 18, wherein the controller is further configured to:
receive the first command from the access device via an interface configured to communicate commands via multiple command queues; and
in response to determining that the second command is part of the sequential command stream, process a third command received via one of the multiple command queues as part of the sequential command stream rather than as a discrete or random command.

20. The data storage device of claim 18, wherein the first command is received via a first command queue of a plurality of command queues, wherein the first command queue is assigned to a first processor core of the access device, wherein the second command is received via a second command queue of the plurality of command queues, and wherein the second command queue is assigned to a second processor core of the access device.

* * * * *